Oct. 8, 1968     R. L. FLANAGAN     3,404,622
MOBILE VEHICLE PRESS
Filed Jan. 11, 1967     3 Sheets-Sheet 1
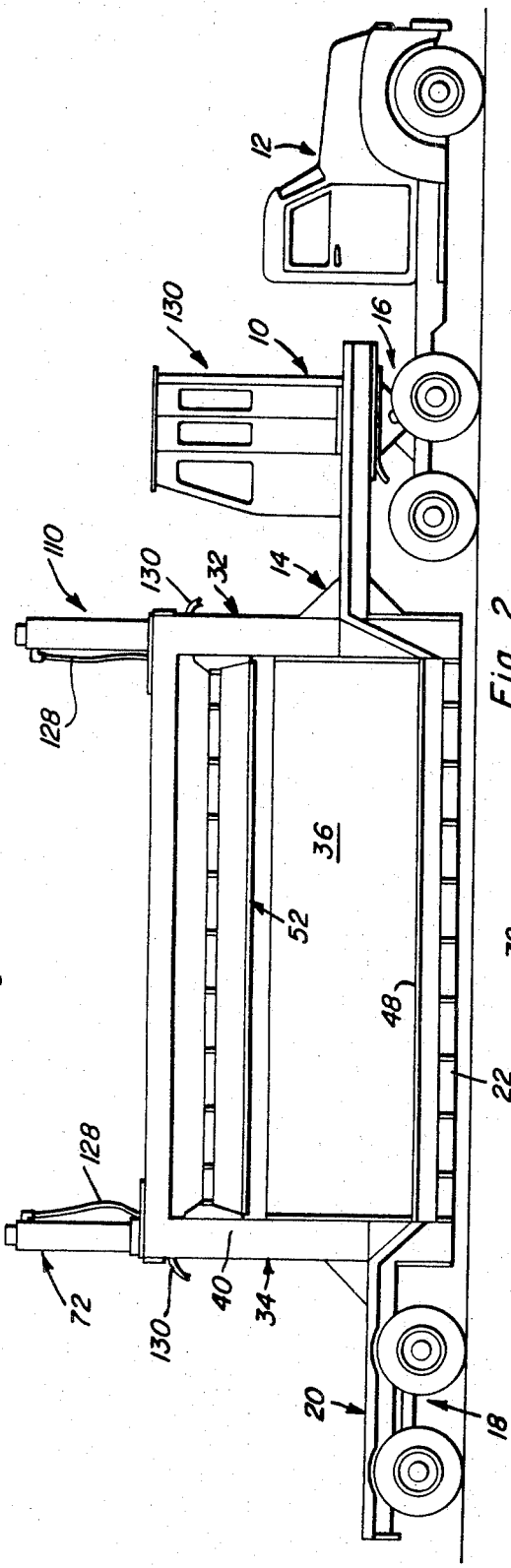
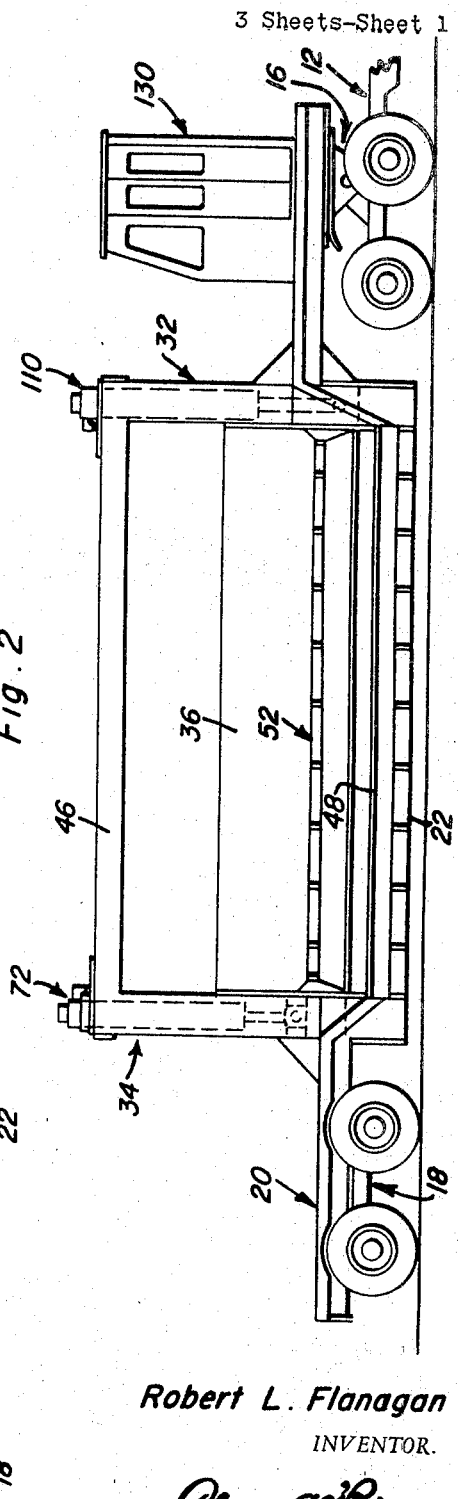
Robert L. Flanagan
INVENTOR.

Oct. 8, 1968  R. L. FLANAGAN  3,404,622
MOBILE VEHICLE PRESS
Filed Jan. 11, 1967  3 Sheets-Sheet 2
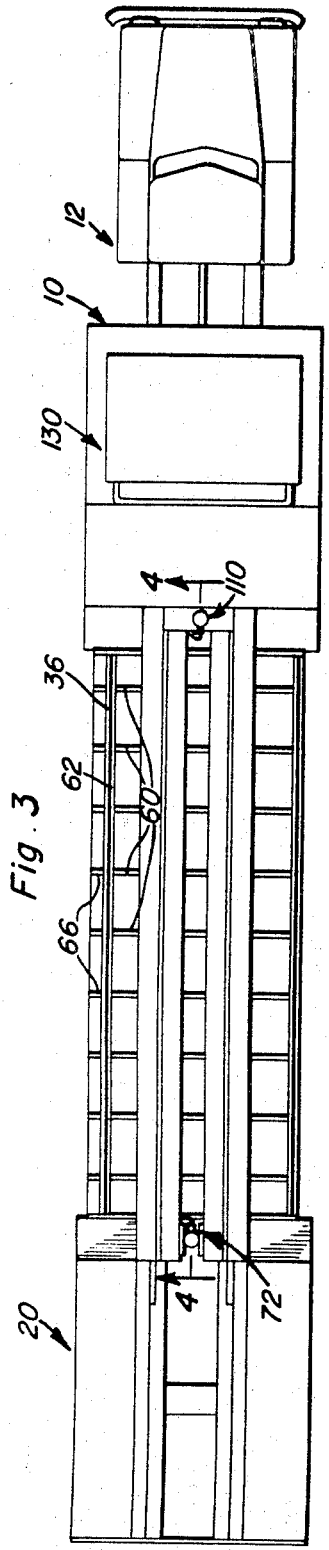
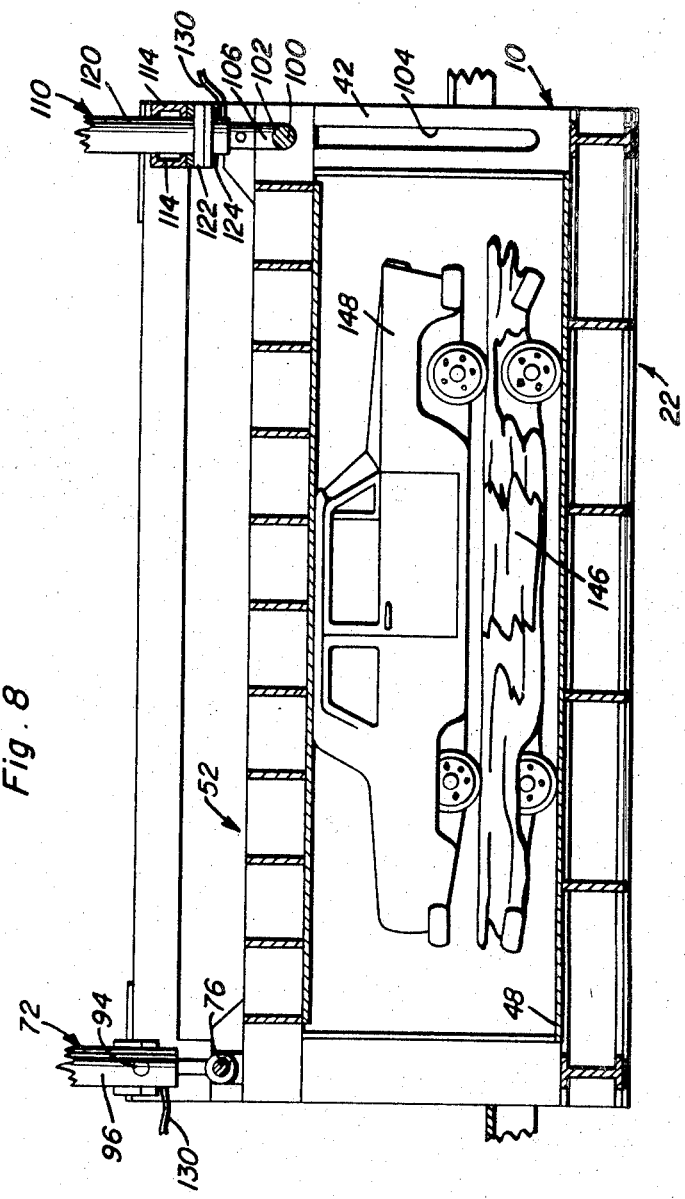
Robert L. Flanagan
INVENTOR.

Oct. 8, 1968  R. L. FLANAGAN  3,404,622
MOBILE VEHICLE PRESS
Filed Jan. 11, 1967  3 Sheets-Sheet 3

Robert L. Flanagan
INVENTOR.

BY *Clarence A. O'Brien*
and *Harvey B. Jacobson*
Attorneys

United States Patent Office 3,404,622
Patented Oct. 8, 1968

3,404,622
MOBILE VEHICLE PRESS
Robert L. Flanagan, Dallas, Tex., assignor, by mesne assignments, to Aspec, Inc., Dallas, Tex., a corporation of Texas
Filed Jan. 11, 1967, Ser. No. 608,621
5 Claims. (Cl. 100—100)

ABSTRACT OF THE DISCLOSURE

A mobile vehicle crushing press including a horizontal base adapted to support a vehicle to be crushed and a vertically movable pressure head which may be forced toward the base for crushing a vehicle between the base and the pressure head.

---

This invention relates to a novel and useful vehicle of the tractor semi-trailer type whose semi-trailer portion includes a drop center portion defining a base upon which a vehicle to be crushed may be placed. The semi-trailer includes a pressure head mounted above the base defining drop center portion thereof and mounted for movement toward and away from the base whereby a vehicle to be crushed may be crushed between the pressure head and the base. The pressure head is supported from upstanding hydraulic cylinders which project upwardly from opposite ends of the pressure head and have their cylinder portions removably supported in elevated position from the semi-trailer and their piston rod portions extendible downwardly from the cylinder portions and connected to the pressure head at their lower ends. Although this mounting of the cylinder portions of the hydraulic cylinders greatly increases the over-all height of the semi-trailer portion, the upwardly projecting cylinder portions, after the pressure head has been moved downwardly to its lowermost position, may be dismounted from the supporting portions of the semi-trailer therefor and lowered relative to the supporting portions upon retraction of the hydraulic cylinders. Therefore, the over-all height of the semi-trailer portion may be greatly reduced for transit.

The main object of this invention is to provide a mobile press for crushing vehicles that may be readily moved from one location to another where junked vehicles or the like are to be pressed or crushed into a compact state.

Another object of this invention is to provide a mobile vehicle press or crusher whose over-all height may be appreciably reduced for and during transit of the mobile press from one location to another.

A still further object of this invention is to provide a mobile press into which vehicles to be crushed may be readily loaded.

Still another object of this invention is to provide a means for crushing or pressing a plurality of junked vehicles or the like in a manner such that more than one junked vehicle may be compressed into a single compacted body of crushed metal for ease in handling the crushed vehicles during subsequent shipment to metal reclaiming locations.

A final object of this invention to be specifically enumerated herein is to provide a mobile press in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the mobile press illustrating the vertically movable pressure head portion thereof in an elevated position;

FIGURE 2 is a fragmentary side elevational view similar to FIGURE 1 but illustrating the vertically movable pressure head in a lowered position and the pressure head supporting hydraulic cylinders in lowered transit positions;

FIGURE 3 is a top plan view of the assemblage illustrated in FIGURE 1;

Figure 4:
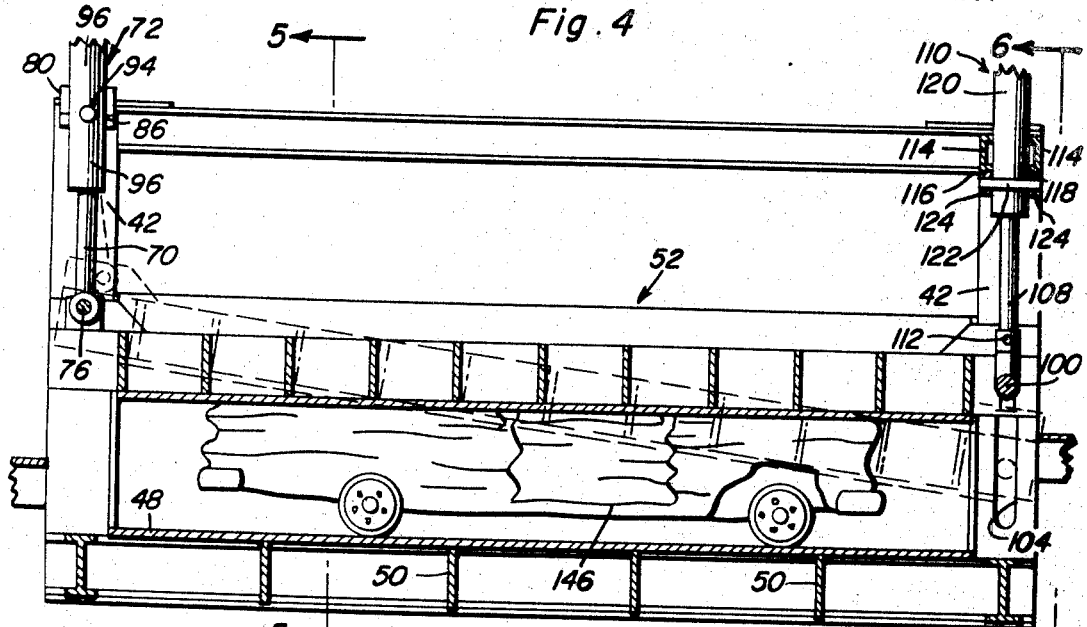
FIGURE 4 is an enlarged fragmentary longitudinal vertical sectional view taken substantially upon the plane indicated by the section line 4—4 of FIGURE 3 and illustrating the manner in which a vehicle may be crushed in the press, an alternate position of the pressure head being illustrated in phantom lines.
Figure 5:
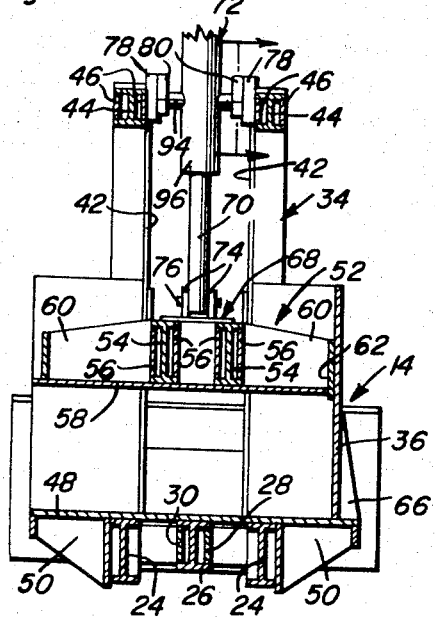
FIGURE 5 is a fragmentary vertical transverse sectional view taken substantially upon the plane indicated by the section line 5—5 of FIGURE 4.
Figure 6:
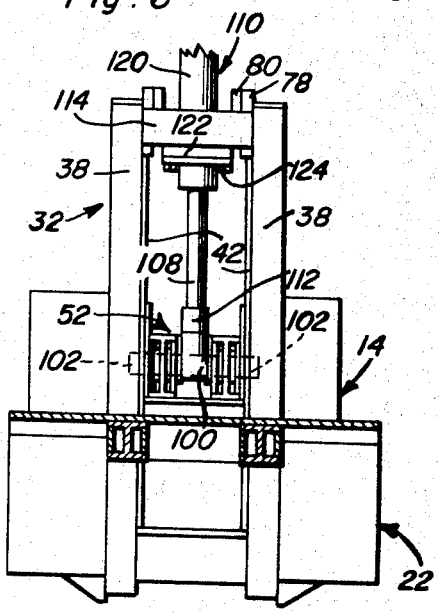
FIGURE 6 is a fragmentary vertical transverse sectional view taken substantially upon the plane indicated by the section line 6—6 of FIGURE 4.
Figure 7:
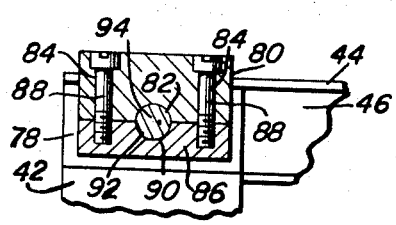

FIGURE 7 is an enlarged fragmentary vertical sectional view taken substantially upon the plane designated by the section line 7-7 of FIGURE 5; and FIGURE 8 is a fragmentary enlarged longitudinal vertical sectional view similar to FIGURE 4 and illustrating the manner in which a second vehicle to be crushed may be placed on top of a previously crushed vehicle within the press in order that subsequent crushing of the two vehicles will form a composite single body of crushed metal with the adjacent portions of the vertically stacked vehicles being crushed intermingled with each other in interlocking relation so as to effectively secure the two crushed vehicles together for ease in subsequent handling of the two crushed vehicles.

Referring now more specifically to the drawings the numeral 10 generally designates the vehicle of the instant invention. The vehicle 10 includes a tractor portion generally referred to by the reference numeral 12 and a semi-trailer portion generally referred to by the reference numeral 14. The forward end of the trailer portion 14 is secured to the rear end of the tractor portion 12 by means of a conventional fifth wheel assembly referred to in general by the reference numeral 16 and the rear end of the trailer portion 14 is supported by means of a conventional dual tandem axle assembly generally referred to by the reference numeral 18.

The trailer portion 14 includes an elongated and generally horizontally disposed chassis or frame referred to in general by the reference numeral 20 including a drop center portion 22 of low ground clearance and defining a base. The frame or chassis 20 is of course of heavy construction and the drop center portion 22 includes a pair of large opposite side and longitudinally extending I-beam members 24 and a smaller center longitudinally extending I-beam member 26 including bracing plates 28 and 30 extending longitudinally thereof and boxing in the opposite sides of the beam 26. Further, the drop center portion 22 includes front and rear end upstanding standard assemblies generally referred to by the reference numerals 32 and 34 between which an upstanding heavy gauge longitudinal side wall 36 extends. The standard assemblies 32 and 34 each include transversely spaced upstanding I-beam members 38 whose opposite sides are filled in by means of bracing plates 40 similar to bracing plates 28 and 30. Further, the opposing bracing plates 40 carried by each pair of transversely aligned I-beam members 38 have bearing plates 42 secured to their inner surfaces.

The upper ends of the I-beam members 38 disposed on each side of the trailer portion 14 are interconnected by means of a longitudinal I-beam 44 secured between the upper ends thereof and whose opposite sides are boxed in by means of bracing plates 46 similar to bracing plates 28, 30 and 40. In addition to the beams 24 and 26 the base 22 includes a heavy gauge flooring plate 48 and suitable longitudinally spaced and transversely extending gusset plates 50 are secured between the outer sides of the beams 24 and the corresponding extended opposite side marginal edge portions of the flooring plate 48 at points spaced longitudinally along the base 22.

The trailer portion 14 further includes a generally horizontally disposed pressure or crusher head referred to in general by the reference numeral 52 including a pair of transversely spaced longitudinal beams 54 boxed in by means of opposite side bracing plates 56 and supporting a top pressure plate 58 opposing the flooring plate 48, suitable transversely extending vertical gusset plates 60 being secured between the remote sides of the beams 54 and the corresponding outwardly extended longitudinal edge portions of the pressure plate 58 at points spaced longitudinally therealong.

The side of the pressure or crusher head 52 adjacent the side wall 36 is provided with a vertical longitudinally extending bearing plate 62 whose outer surface is disposed in sliding contacting relation with the confronting inner surface portions of the side wall 36. The flooring panel 48 projects outwardly beyond the lower end of the side wall 36 and a plurality of longitudinally spaced upstanding buttress plates 66 are secured between the outer surface of the side wall 36 and the upper surface of the extended portion of the flooring panel 48 projecting outwardly beyond the lower end of the side wall 36.

The rear end of the pressure or crusher head 52 includes a bifurcated mount generally referred to by the reference numeral 68 secured to the upper surfaces of the corresponding ends of the I-beams 54. The lower end portion of a piston rod portion 70 of a fluid motor referred to in general by the reference numeral 72 is pivotally secured between the furcations 74 of the mount 68 by means of a pivot fastener 76. The bearing plates 42 terminate at their upper ends a spaced distance below the upper ends of the I-beam members 38 of the standard assembly 34 and a pair of spaced blocks 78 rest upon the upper end edges of the bearing plates 42 and are secured to the bracing plates 46 and the inner edge of the top flange of the I-beam members 44. Further, a pair of upper journal blocks 80 are secured to the confronting surfaces of the spacer blocks 78 and include a pair of axially aligned and downwardly opening half cylindrical recesses 82 formed therein. In addition, the journal blocks 80 have a pair of vertically extending fastener receiving bores 84 formed therethrough and a pair of lower journal blocks 86 are supported from the journal blocks 80 by means of fasteners 88 secured through the bores 84 and threadedly engaged in the journal blocks 86, the latter including a pair of axially aligned upwardly opening half cylindrical recesses 90 coacting with the corresponding recesses 82 to form journal bores 92 which rotatably receive aligned outwardly projecting pin portions 94 carried by opposite sides of the cylinder portion 96 of the hydraulic cylinder or fluid motor 72. Accordingly, it may be seen that the hydraulic cylinder 72 is mounted for oscillation about a horizontal transverse axis.

The forward end of the pressure or crusher head 52 rotatably supports an axle pin 100 whose opposite end portions 102 are journaled through corresponding axially aligned bores formed through the I-beam members 54 and the bracing plates 56. Further, the bearing plates 42 carried by the I-beam members 38 of the standard assembly 32 as well as the underlying bracing plates 40 have vertically extending slots 104 formed therein which slidingly receive therethrough the terminal end portions of the opposite end portions 102 of the pivot pin or shaft 100.

The central portion of the pivot pin 100 includes an integral and upwardly projecting neck portion 106 received between the I-beam members 54 and the lower terminal end of the piston rod portion 108 of a second hydraulic cylinder generally referred to by the reference numeral 110 is secured in an upwardly opening recess provided therefor in the upper end of the neck portion 106 by means of a removable fastener 112.

The upper ends of the I-beam members 38 of the standard assembly 32 are interconnected by means of a pair of opposing transversely extending channel members 114 and a suitable annular member 116 defining a bore 118 extending therethrough is secured to the undersurface portions of the channel members 114 centrally intermediate their opposite ends. The cylinder portion 120 of the hydraulic cylinder 110 includes a radially outwardly projecting mounting flange 122 adjacent its lower end from which the piston rod portion 108 projects and a plurality of fasteners 124 removably secure the mounting flange portion 122 to the annular member 116.

The upper and lower ends of the hydraulic cylinders 72 and 110 are operatively connected to any suitable source of hydraulic fluid under pressure by means of pressure lines 128 and 130 and the hydraulic cylinders 72 and 110 may be actuated by any suitable forms of hydraulic controls operatively connected thereto disposed within the operator's compartment generally referred to by the reference numeral 132 carried by the forward end of the trailer portion 14. Of course, the operator's compartment 130 includes rearwardly facing windows through which the operator of the vehicle press 10 may view the crushing operation of a vehicle disposed on the flooring panel 48 between the I-beam members 38 of the forward standard assembly 32.

In operation, a vehicle to be crushed may be readily deposited in position on the flooring panel 48 by any suitable means such as a forklift truck after the pressure or crusher head 52 has been raised to the elevated position thereof illustrated in FIGURE 1 of the drawings. Thereafter, the extreme heavy weight of the crusher head 52 and actuation of the hydraulic cylinders 72 and 110 may be utilized to force the crusher head 52 downward to crush the vehicle 146 in the manner illustrated in FIGURE 4 of the drawings, it being noted that the hydraulic cylinder 72 is free to oscillate about a horizontal transverse axis and therefore that the pressure or crusher head 32 may be inclined as indicated by phantom lines in FIGURE 4 of the drawings with the forward end of the crusher head 52 being guided by the opposite end portions of the pivot shaft 100 being slidably received in the vertical slots 104 formed in the corresponding bearing plates 42 and bracing plates 40.

As soon as the vehicle 146 has been crushed, the crusher head 52 may be raised upon actuation of the hydraulic cylinders 72 and 110 and the crushed vehicle 146 may be removed by the same forklift truck for placement upon a suitable carrier such as a flat bed semi-trailer truck for transport to a location where scrap metal is reclaimed.

If it is desired, before the first crushed vehicle 146 is removed a second vehicle 148 to be crushed may be placed on top of the first crushed vehicle 146 and the pressure or crusher head 52 may then be lowered so as to crush the vehicle 148, crushing the vehicle 148 while positioned on top of the crushed vehicle 146 being operable to cause the undercarriage and running gear portions of the vehicle 148 to be interlockingly engaged with the upper surface portions of the crushed vehicle 146 and thereby reasonably securely attaching the vehicles 146 and 148 together for ease in simultaneous handling such as removal from the vehicle press 10 and placement upon a carrier vehicle for transport to a new location.

In addition, inasmuch as the maximum clearance between the crusher head 52 and the flooring plate 48 is appreciably greater than the height of an average vehicle with its wheels removed, the vehicle press 10 is capable of crushing at least three vehicles one on top of the other so as to form an integral unit for ease in handling the three crushed vehicles.

After the vehicle press has been used in the manner hereinbefore described and it is desired to transport the vehicle press 10 to a new location, in order to reduce the over-all height of the vehicle press 10, the crusher head 52 is first lowered to its lowermost position in a manner supporting the weight of the crusher head 52 independent of the hydraulic cylinders 72 and 110. Then, the fasteners 124 and 88 are removed and the hydraulic cylinders 72 and 110 are retracted in a manner lowering the cylinder portions 96 and 120 thereof relative to the upper ends of the standard assemblies 34 and 32 thus reducing the over-all height of the vehicle press 10 from that height illustrated in FIGURE 1 of the drawings to the height illustrated in FIGURE 2 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for crushing junked vehicles including a base, a pressure head supported from and above said base and for movement toward and away from the latter for crushing a vehicle disposed on said base below said pressure head, said base including a pair of opposing upstanding support means disposed on opposite sides of the area through which said pressure head is movable during its movement toward and away from said base, said pressure head being shiftable between upper and lowermost limit positions, longitudinally extendible elongated motor means including upper base portions carried by upper portions of said pair of support means and projecting upwardly thereabove, said motor means also including lower portions which may be raised and lowered relative to said upper base portions and secured to adjacent portions of said pressure head, said upper base portions being removably secured to said upper portions of said opposing upstanding support means and, after lowering of said pressure head to its lowermost position upon the extension of said motor means, being lowerable relative to said opposing upstanding support means after releasing said base portions from said opposing upstanding support means upon subsequent retraction of said motor means so as to lower said base portions relative to said lower portions.

2. The combination of claim 1 wherein said support means comprises a pair of opposing upstanding wall means, said base including third upstanding wall means extending between corresponding ends of said opposing wall means at least partially enclosing said area through which said pressure head is movable during its movement toward and away from said base.

3. The combination of claim 1 wherein said base comprises a portion of a wheeled vehicle movable from one location to another where junked vehicles are to be crushed.

4. The combination of claim 1 wherein said motor means includes a pair of extendible motors, the upper base portion of one of said extendible motors being removably pivotally secured to the upper portion of the corresponding support means for oscillation about a horizontal axis disposed at generally right angles relative to a line extending between said motors, the lower portions of said fluid motors being pivotally secured to said pressure head for relative oscillation about axes generally paralleling the first mentioned axis.

5. The combination of claim 4 wherein the portion of said pressure head secured to the lower portion of the other extendible motor is guided from said base for movement along a predetermined upstanding path.

References Cited
UNITED STATES PATENTS

| | | | |
|---|---|---|---|
| 2,579,176 | 12/1951 | Dalton | 100—269 XR |
| 2,932,244 | 4/1960 | Moyer. | |
| 3,109,363 | 11/1963 | Collins | 100—269 XR |
| 3,170,389 | 2/1965 | Parks. | |
| 3,237,554 | 3/1966 | Davis | 100—233 XR |

BILLY J. WILHITE, *Primary Examiner.*